(12) United States Patent
Choi et al.

(10) Patent No.: US 8,875,904 B2
(45) Date of Patent: Nov. 4, 2014

(54) CIRCULAR FILTERING DISC AND FILTER DEVICE HAVING THE SAME

(75) Inventors: Chang Hyun Choi, Seoul (KR); Dae Hyun No, Gwangmyung-si (KR); Jong Sang Kim, Gyeongbuk (KR)

(73) Assignee: K-1 Ecotech Co., Ltd., Seoul (KR)

( * ) Notice: Subject to any disclaimer, the term of this patent is extended or adjusted under 35 U.S.C. 154(b) by 571 days.

(21) Appl. No.: 12/911,133

(22) Filed: Oct. 25, 2010

(65) Prior Publication Data

US 2011/0253618 A1   Oct. 20, 2011

(30) Foreign Application Priority Data

Apr. 19, 2010  (KR) .................. 10-2010-0035619

(51) Int. Cl.
  *B01D 29/39*  (2006.01)
  *B01D 25/26*  (2006.01)
  *B01D 29/00*  (2006.01)

(52) U.S. Cl.
  CPC ...................... *B01D 25/26* (2013.01)
  USPC ........... 210/437; 210/486; 210/487; 210/488; 210/314; 210/316; 210/335; 210/346; 210/347; 210/440; 210/443

(58) Field of Classification Search
  USPC ......... 210/437, 486–488, 252, 255, 261, 314, 210/316, 335, 346, 347, 440, 443
  See application file for complete search history.

(56) References Cited

U.S. PATENT DOCUMENTS

| | | | |
|---|---|---|---|
| 2,658,624 A * | 11/1953 | Redner | 210/344 |
| 2,813,632 A * | 11/1957 | Muller | 210/486 |
| 5,607,584 A * | 3/1997 | Swiatek et al. | 210/238 |
| 6,942,796 B2 * | 9/2005 | Lacasse et al. | 210/316 |

FOREIGN PATENT DOCUMENTS

KR   100853990   8/2008

* cited by examiner

*Primary Examiner* — Nam Nguyen
*Assistant Examiner* — Madeline Gonzalez
(74) *Attorney, Agent, or Firm* — IPLA P.A.; James E. Bame

(57) ABSTRACT

A circular filtering disc and a filter device having the filtering disc. The filtering disc includes a circular partition plate having an inner hub and an outer rim, with radial inlet holes formed in the outer rim and introducing water to the partition plate, and a vertical outlet hole formed in the center of the inner hub and discharging pure water; and a filter fabric placed on or below the partition plate, wherein water supplied to the filtering disc passes through the filter fabric and becomes concentrated at the vertical outlet hole, and is discharged from the filtering disc through the vertical outlet hole. In the filter device, raw water is supplied through the circumferential edges of the circular filtering discs stacked on top of one another in the filter device and is filtered prior to being discharged from the filter device through the center of the filtering discs.

4 Claims, 5 Drawing Sheets

CIRCULAR FILTERING DISC AND FILTER DEVICE HAVING THE SAME

CROSS REFERENCE

This application claims foreign priority under Paris Convention and 35 U.S.C. §119 to Korean Patent Application No. 10-2010-0035619, filed Apr. 19, 2010 with the Korean Intellectual Property Office.

BACKGROUND OF THE INVENTION

1. Technical Field

The present invention relates, in general, to a circular filtering disc and a filter device having the filtering disc and, more particularly, to a circular filtering disc and a filter device having the filtering disc, in which raw water is supplied to the filter device through the circumferential edges of a plurality of circular filtering discs stacked on top of one another in the filter device and is filtered prior to being discharged from the filter device through the center of the filtering discs.

2. Description of the Related Art

Generally, to produce drinking water from the raw water of a natural spring, the raw water must be subjected to several processes for removing sludge from the water and for purifying the water. Further, to supply water to a public swimming pool or to recycle the water of the swimming pool, it is required to completely remove even fine sludge from the water.

A conventional filter device used for executing the water filtering processes includes a plurality of filtering discs having a rectangular shape, which are stacked on top of one another in the filter device, as shown in FIG. 1.

Each of the conventional filtering discs 10 includes a vertical inlet hole 14, which is vertically formed through the disc 10 in an edge of the disc 10 and supplies raw water to the filter device, and a vertical outlet hole 15, which is vertically formed through the disc 10 in another edge of the disc 10 and discharges filtered pure water from the filter device to the exterior. A middle plate 11 horizontally lies in a middle portion between the vertical inlet hole 14 and the vertical outlet hole 15. The middle plate 11 is provided with a plurality of partitions on each of upper and lower surfaces thereof, thus forming a plurality of upper and lower channels 12 and 12a at locations between the partitions. Placed on the upper channels 12 is a filter fabric 13.

A radial inlet hole 14a is formed in the filtering disc 10 such that the upper channels 12 communicate with the vertical inlet hole 14 by way of the radial inlet hole 14a. In the same manner, a radial outlet hole 15a is formed in the filtering disc 10 such that the lower channels 12a communicate with the vertical outlet hole 15 by way of the radial outlet hole 15a.

To fabricate a filter device, a plurality of filtering discs 10 having the above-mentioned structure are stacked on top of one another and, thereafter, the filtering discs 10 are tightened together using upper and lower end plates placed on the top and bottom of the discs 10. Raw water is supplied to the filter device through the vertical inlet holes 14 of the filtering discs 10 and is filtered by the discs 10 prior to being discharged from the filter device to the exterior.

Here, to improve the filtering efficiency of the filter device, a filter medium, such as active carbon, is applied to the filter fabrics 13. To apply the filter medium to the filter fabrics 13 prior to executing a filtering operation, the filter medium, such as the active carbon, is added to raw water and is supplied along with the raw water to the filtering disc through the vertical inlet holes 14 such that the active carbon can be applied to the lower surfaces of the filter fabrics 13, thus being coated thereon to a predetermined thickness.

After completing the application of the filter medium to the filter fabrics 13, raw water to be filtered is applied to the filtering disc through the vertical inlet holes 14 and is filtered by the filter fabrics 13 while the raw water passes through the filter fabrics 13 placed below the respective filtering discs 10. Filtered pure water is discharged from the filter device to the atmosphere through the vertical outlet holes 15.

However, because the conventional filtering disc has a rectangular shape, raw water is supplied to the filtering disc through only the left edge and filtered pure water is discharged from the filtering disc through only the right edge (of course, although pure water may be supplied to the disc through the front edge and pure water may be discharged through the rear edge, the water inlet and outlet edges of the disc are referred to as left and right edges based on FIG. 1), so that water pressure concentrically acts on the left and right edges of the filtering disc.

Therefore, water resistance acting on the filtering disc is not evenly distributed on the entire surface of the filtering disc, but is concentrically distributed on the left and right edges of the filtering disc, thus reducing the filtering efficiency. Further, because water pressure concentrically acts on the edges of the filtering disc, when the filtering disc receives an impact at the edges it may break.

Further, the filter fabrics are partially contaminated at the edges, so that the filtering discs must be frequently replaced by new ones, thus increasing the maintenance cost of the filter device.

SUMMARY OF THE INVENTION

Accordingly, the present invention has been made keeping in mind the above problems occurring in the related art, and the present invention is intended to propose a circular filtering disc and a filter device having the filtering disc, in which raw water can flow into the filter device through the circumferential edges of a plurality of filtering discs stacked on top of one another in the filter device and filtered pure water can be collected in the center of the filtering discs and is discharged from the filter device through the center, so that water pressure can be evenly distributed over the entire surface of filtering discs and thereby the filtering discs can be protected from breaking.

Further, the present invention is intended to provide a circular filtering disc and a filter device having the filtering disc, which has improved filtering efficiency and in which a filter fabric can be evenly spread out over the entire surface of the fabric.

In order to achieve the above object, according to one aspect of the present invention, there is provided a circular filtering disc, comprising: a circular partition plate having an inner hub and an outer rim, with a plurality of radial inlet holes formed in the outer rim and introducing water to the partition plate, and a vertical outlet hole formed in a center of the inner hub and discharging pure water; and a filter fabric placed on or below the partition plate, wherein water supplied to the filtering disc through the plurality of radial inlet holes passes through the filter fabric and becomes concentrated at the vertical outlet hole, and is discharged from the filtering disc through the vertical outlet hole.

In the circular filtering disc, the partition plate may be provided with an upper channel and a lower channel defined on and below the upper and lower surfaces thereof at locations between the inner hub and the outer rim.

Further, the partition plate is inclined such that the inner hub has a height higher or lower than that of the outer rim.

In another aspect of the present invention, there is provided a filter device having a filtering disc, comprising: a housing receiving therein a plurality of filtering discs stacked on top of one another; upper and lower casings mounted to upper and lower ends of the housing and sealing the filtering discs received in the housing; and an inlet pipe and an outlet pipe connected to one of the upper and lower casings such that the inlet pipe communicates with the vertical inlet holes formed in the outer rims of the filtering discs and the outlet pipe communicates with the vertical outlet holes formed in the inner hubs of the filtering discs.

In the circular filtering disc and the filter device having the filtering disc according to the present invention, raw water to be filtered can be evenly supplied to the filtering disc through a plurality of vertical inlet holes formed through the circumferential edge of the filtering disc at locations over the entire circumferential edge and filtered pure water can be discharged from the filtering disc through a vertical outlet hole formed through the center of the filtering disc, so that the present invention realizes improved filtering efficiency.

Further, the raw water to be filtered can be evenly supplied to the filtering disc through the vertical inlet holes formed through the circumferential edge of the filtering disc at locations over the entire circumferential edge, so that the water pressure acting on the filter device can be reduced and the device is not loaded with excessive water pressure, thus preventing the filtering discs from breaking.

Further, the raw water to be filtered can be evenly supplied to the filter fabric by way of the vertical inlet holes formed through the circumferential edge of the filtering disc at locations over the entire circumferential edge, so that the raw water can be evenly filtered by the entire surface of the filter fabric. Therefore, contaminants can be evenly distributed over the entire surface of the filter fabric, so that the frequency of back-flushing or changing the filter fabrics can be minimized, thus reducing the maintenance expenses of the filter device.

BRIEF DESCRIPTION OF THE DRAWINGS

The above and other objects, features and advantages of the present invention will be more clearly understood from the following detailed description when taken in conjunction with the accompanying drawings, in which.

DESCRIPTION OF SPECIFIC EMBODIMENTS

Figure 1:
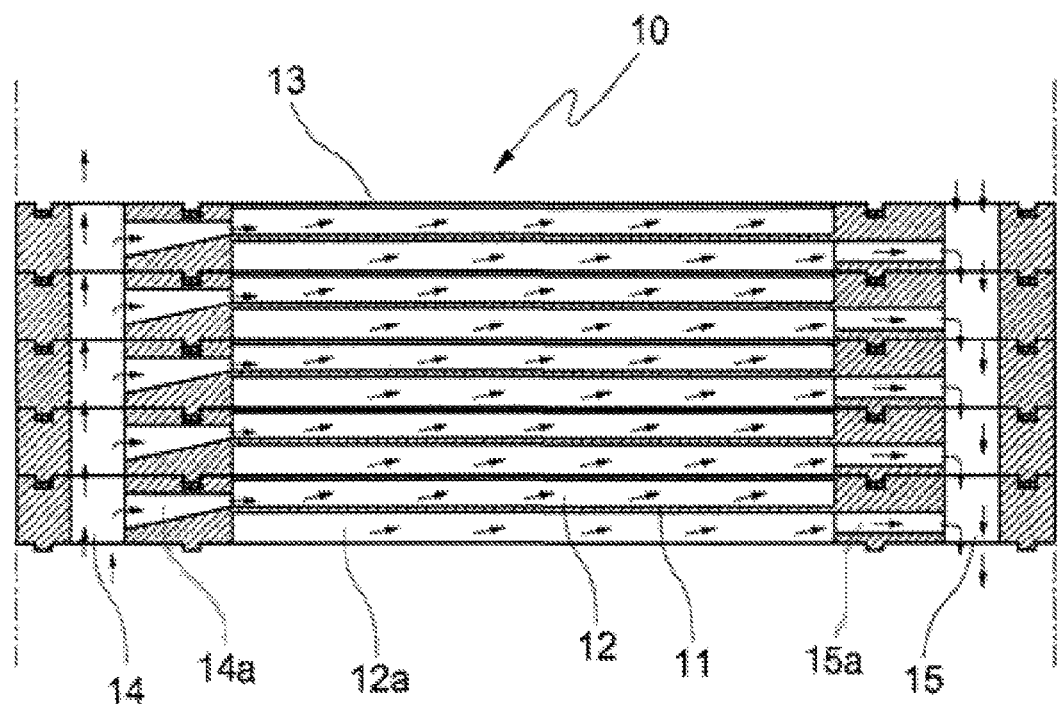
FIG. 1 is a sectional view illustrating the construction of a convention filter device.

Reference will now be made in greater detail to a preferred embodiment of the invention, an example of which is illustrated in the accompanying drawings. Wherever possible, the same reference numerals will be used throughout the drawings and the description to refer to the same or like parts.

FIGS. 2 through 5 are views illustrating a filter device having filtering discs according to the present invention.

Figure 2:
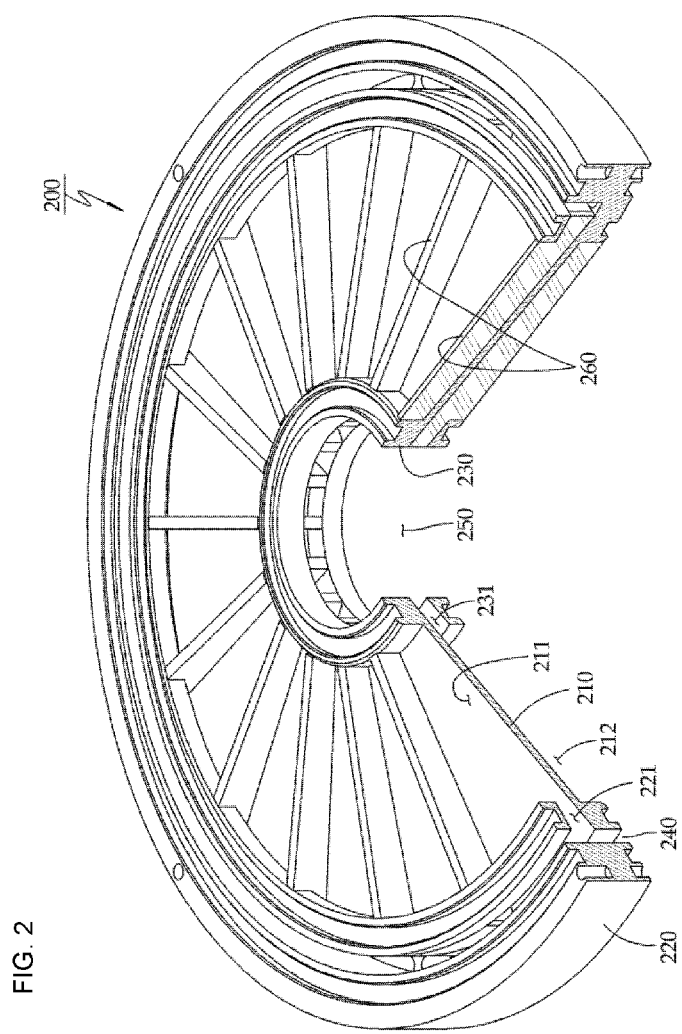
FIG. 2 is a partially sectioned perspective view illustrating a filtering disc constituting a filter device according to the present invention.

As shown in FIG. 2, the circular filtering disc 200 according to the present invention comprises a circular inner hub 230 and a circular outer rim 220, which has a diameter larger than that of the inner hub 230 and surrounds the inner hub 230. A partition plate 210 radially extends between the outer rim 220 and the inner hub 230 and separates the upper space from the lower space. The partition plate 210 is preferably inclined such that the height of the inner hub 230 is higher or lower that of the outer rim 220.

Therefore, an upper channel 211 and a lower channel 212 are defined on the upper and lower surfaces of the partition plate 210. A plurality of partition ribs 260 are vertically installed in each of the upper and lower channels 211 and 212 such that each of the channels 211 and 212 is partitioned by the partition ribs 260 at regular intervals. Filter fabrics 270 are placed on the upper channel 211 and below the lower channel 212. Here, a filter medium, such as active carbon or diatomite, is applied to the filter fabric 270.

A plurality of vertical inlet holes 240 for introducing raw water to the partition plate 210 are formed through the outer rim 220 in vertical directions such that the vertical inlet holes 240 are arranged along the outer rim 220 in a state in which the vertical inlet holes 240 are spaced apart from each other at regular intervals.

Further, a plurality of radial inlet holes 221 are formed in the outer rim 220 in radial directions such that the vertical inlet holes 240 communicate with the upper channel 211 by way of the radial inlet holes 240. In the same manner as that described for the vertical inlet holes 240, the radial inlet holes 221 are arranged along the outer rim 220 in a state in which the radial inlet holes 221 are spaced apart from each other at regular intervals.

Further, in the center of the inner hub 230, a vertical outlet hole 250 is formed. The vertical outlet hole 250 discharges pure water filtered by the filter fabric 270. A plurality of radial outlet holes 231 are formed in the inner hub 230 in radial directions such that the lower channel 212 communicates with the vertical outlet hole 250. The radial outlet holes 231 are arranged along the inner hub 230 in a state in which the radial outlet holes 231 are spaced apart from each other at regular intervals.

Therefore, raw water is introduced to the filtering disc 200 through the radial inlet holes 221 of the outer rim 220. Thereafter, the raw water passes through the filter fabric 270 and is filtered, and then the filtered pure water is discharged to the vertical outlet hole 250 formed in the center of the filtering disc 200 through the radial outlet holes 231 of the inner hub 230, so that pressure of water (hydraulic resistance) acting on the filtering disc 200 can be evenly distributed. Thus, the present invention can improve water filtering efficiency of the filter device and can evenly distribute contaminants over the entire surface of the filter fabric 270, so that the frequency of back-flushing or replacing the filter fabric 270 can be reduced.

The filtering disc 200 is provided with sealing grooves on the upper and lower surfaces of each of the outer rim 220 and the inner hub 230. A rubber packing 280 in the form of an O-ring is pressure-seated in each of the sealing grooves, thus realizing desired water tightness of the filtering disc 200.

Figure 3:
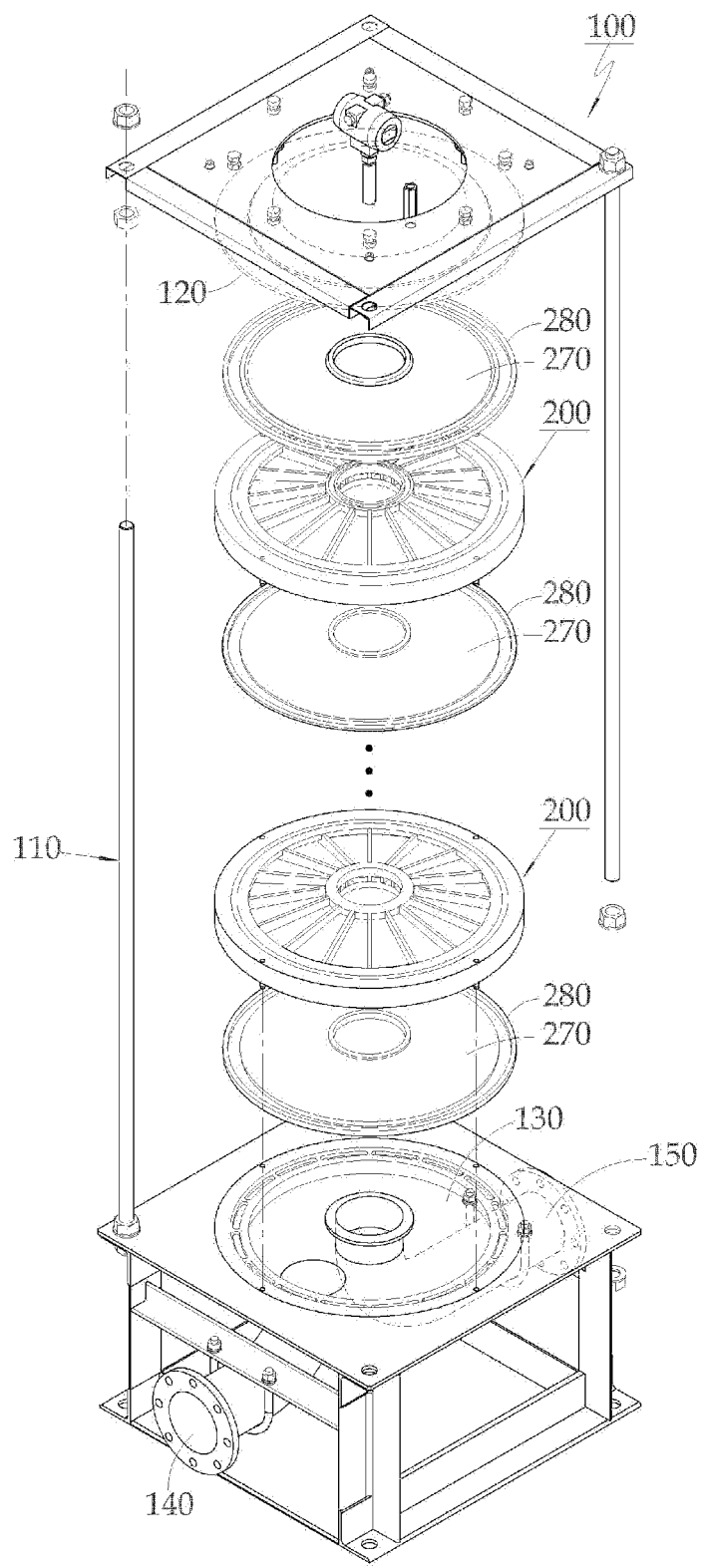
FIG. 3 is an exploded perspective view illustrating the filter device according to the present invention.
Figure 4:
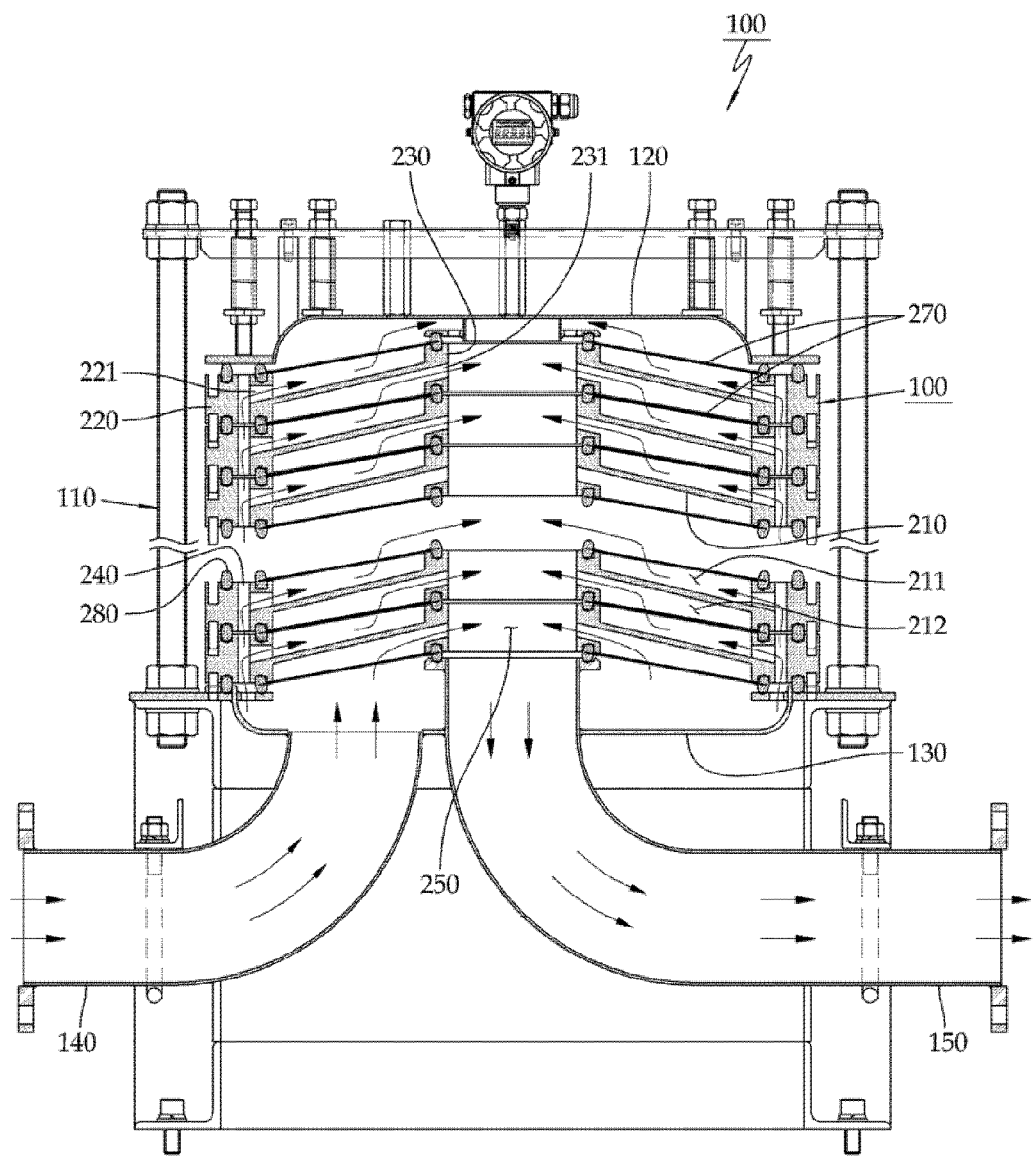
FIG. 4 is a sectional view illustrating the filtering operation of the filter device according to the present invention.

In the present invention, a plurality of filtering discs 200 having the above-mentioned structure are stacked on top of each other in the filter device 100, as shown in FIG. 3 and FIG. 4.

As shown in FIGS. 3 and 4, the filter device 100 comprises a housing 110, in which: a plurality of filtering discs 200 are stacked on top of one another, upper and lower casings 120 and 130 are mounted to the upper and lower ends of the housing 110 and seal the filtering discs 200 installed in the housing 110, and an inlet pipe 140 and an outlet pipe 150 are connected to the lower casing 130.

Here, the inlet pipe 140 communicates with the vertical inlet holes 240 formed in the outer rims 220 of the respective filtering discs 200. The outlet pipe 150 communicates with the vertical outlet holes 250 formed inside the inner hubs 230 of the respective filtering discs 200.

Therefore, the inlet pipe 140 and the outlet pipe 150, which are connected to the lower casing 130, does not communicate with each other in the lower casing 130, so that raw water introduced into the filter device 100 through the inlet pipe 140 is not mixed with pure water discharged from the filter device 100 through the outlet pipe 150.

Hereinbelow, operation of the filter device having the filtering discs according to the present invention will be described.

First, prior to using the filter device 100 of the present invention, a filter medium, such as active carbon or diatomite, is applied to the filter fabric 270 placed between the filtering discs 200. To realize the application of the filter medium to the filter fabrics 270, the filter medium is added to raw water and the raw water mixed with the filter medium is supplied under pressure to the filter device 100 through the inlet pipe 140.

When the raw water mixed with the filter medium is supplied under pressure through the inlet pipe 140, the raw water flows upwards due to the pressure through the vertical inlet holes 240 of the filtering discs 200 and flows under even pressure into the upper channels 211 on the filtering discs 200 through the radial inlet holes 221 of the filtering discs 200, and then passes through the upper filter fabrics 270. In the above state, the water, which has passed through the filter fabrics 270, flows into the upper channels 212 and is discharged through the radial outlet holes 231. However, the filter medium is filtered by the filter fabrics 270 and is evenly applied to the lower surfaces of the filter fabrics 270, thus being coated thereon to a predetermined thickness.

When the application of the filter medium to the filter fabrics 270 is completed, raw water to be filtered is supplied to the filter device 100 through the inlet pipe 140.

In the same manner as that described for the process of applying the filter medium to the filter fabrics 270, the raw water supplied to the filter device 100 through the inlet pipe 140 flows upwards under pressure through the vertical inlet holes 240 of the filtering discs 200 and is distributed under even pressure from the circumferential edges of the filtering discs 200 to the upper channels 211 through the radial inlet holes 221, as shown in FIG. 4.

The raw water, which has been introduced to the upper channels 211 as described above, passes upwards under pressure through the filter fabrics 270 on the upper channels 211, so that foreign substances in the raw water can be filtered out by the filter fabrics 270.

Further, filtered pure water, which was produced as the water passed through the filter fabrics 270, flows into the upper channels 212 of the filtering discs 200 and is discharged to the vertical outlet holes 250 of the filtering discs 200 through the radial outlet holes 231 formed in the inner hubs 230 of the upper filtering discs 200. The pure water is, thereafter, discharged from the filter device to the atmosphere through the outlet pipe 150.

Here, when the partition plates 210 are downwardly inclined outwards such that the inner ends of the plates 210 are higher than the outer ends, the water flows upwards on the plates 210 prior to being discharged to the vertical outlet holes 250 through the radial outlet holes 231. However, when the partition plates 210 are downwardly inclined inwards such that the inner ends of the plates 210 are lower than the outer ends, the water flows downwards on the plates 210 prior to being discharged to the vertical outlet holes 250 through the radial outlet holes 231.

In the filter device of the present invention, raw water to be filtered can be supplied under even pressure from the entire outer circumferential edges of the filtering discs 200 and filtered pure water can be discharged under even pressure from the entire inner circumferential edges of the filtering discs 200, thus realizing improved filtering efficiency. Further, contaminants can be evenly distributed over the entire surface of the filter fabrics 270, thus minimizing the frequency of back-flushing or replacing the filter fabrics 270 and reducing the maintenance expenses of the filter device.

When the filter device repeats the filtering operation for a lengthy period of time, foreign substances filtered out by the filter medium block the mesh of the filter fabrics 270 and deteriorate the filtering efficiency of the filter fabrics 270, so that it is required to periodically execute back-flushing to remove both the filter medium and the foreign substances from the filter fabrics.

Figure 5:
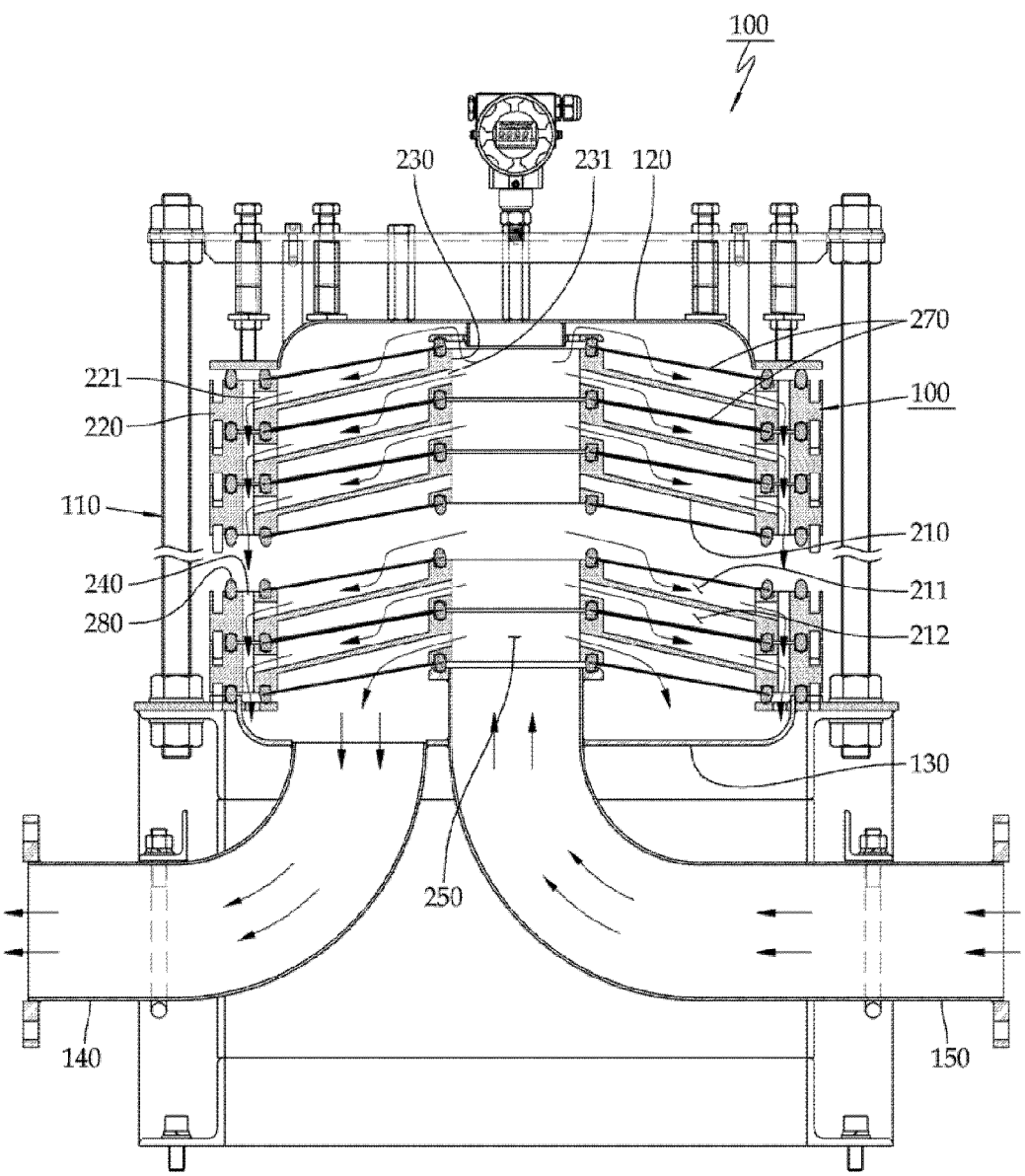
FIG. 5 is a sectional view illustrating a back-flush operation of the filter device according to the present invention.

To execute the back-flushing, unlike the filtering operation, back-flush water is supplied to the filter device through the outlet pipe 150, as shown in FIG. 5. The back-flush water supplied from the outlet pipe 150 flows upwards under pressure through the vertical outlet holes 250 of the filtering discs 200 and flows outwards in radial directions to the lower channels 212 through the radial outlet holes 231 of the filtering discs 200.

In the lower channels 212, pressure of the inlet back-flush water is increased, so that the back-flush water passes through the lower filter fabrics 270. While the back-flush water passes through the lower filter fabrics 270, the back-flush water removes the filter medium and the foreign substances from the lower surfaces of the filter fabrics 270. Thereafter, the back-flush water laden with the filter medium and the foreign substances flows into the upper channels 211 of the lower filtering discs 200. Further, the back-flush water containing the filter medium and the foreign substances is discharged sequentially through the radial inlet holes 221 and the vertical inlet holes 240 of the lower filtering discs 200, and is finally discharged from the filter device 100 to the exterior through the inlet pipe 140, thus completing the back-flushing.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A circular filtering disc, comprising:
a circular partition plate having an inner hub and an outer rim, with a plurality of vertical inlet holes formed through the outer rim in vertical directions for introducing raw water to the partition plate in the vertical directions such that the vertical inlet holes are arranged along the outer rim in a state in which the vertical inlet holes are spaced apart from each other at regular intervals, and with a plurality of radial inlet holes formed in the outer rim in substantially horizontal directions and for receiving the raw water introduced vertically by the plurality of vertical inlet holes and introducing the received water to the partition plate in the substantially horizontal directions, and a vertical outlet hole formed in a center of the inner hub and discharging pure water, such that the vertical inlet holes communicate with the radial inlet holes; and a filter fabric placed on or below the partition plate,
wherein water supplied to the filtering disc through the plurality of radial inlet holes passes through the filter fabric and becomes concentrated at the vertical outlet hole, and is discharged from the filtering disc through the vertical outlet hole, wherein the partition plate is provided with an upper channel and a lower channel defined on and below upper and lower surfaces thereof at locations between the inner hub and the outer rim, wherein a plurality of partition ribs are vertically installed in each of the upper and lower channels radially from the inner hub such that each of the channels is partitioned by the partition ribs at regular intervals, and wherein each of the plurality of partition ribs extends from the inner hub to the outer rim.

2. The circular filtering disc as set forth in claim 1, wherein the partition plate is inclined such that the inner hub has a height higher than that of the outer rim.

3. The circular filtering disc as set forth in claim 1, wherein the partition plate is inclined such that the outer rim has a height higher than that of the inner hub.

4. A filter device having a circular filtering disc as set forth in claim 1, comprising:

a housing receiving therein a plurality of circular filtering discs stacked on top of one another;

upper and lower casings mounted to upper and lower ends of the housing and sealing the filtering discs received in the housing; and both of an inlet pipe and an outlet pipe connected to the lower casing such that the inlet pipe communicates with the vertical inlet holes formed in the outer rims of the filtering discs and the outlet pipe communicates with the vertical outlet holes formed in the inner hubs of the filtering discs.

* * * * *